United States Patent
Consonni

[19]

[11] Patent Number: 6,137,934
[45] Date of Patent: Oct. 24, 2000

[54] OPTICAL CABLE WITH TUBULAR METAL CORE AND METHOD OF MAKING SAME

[75] Inventor: Enrico Consonni, Seregno, Italy

[73] Assignee: Pirelli Cavi e Sistemi S.p.A., Milan, Italy

[21] Appl. No.: 08/977,567

[22] Filed: Nov. 25, 1997

[30] Foreign Application Priority Data

Nov. 29, 1996 [IT] Italy .................................. MI96A2494

[51] Int. Cl.⁷ .................................................. G02B 6/44
[52] U.S. Cl. ........................ 385/109; 385/100; 385/110; 385/111; 385/112
[58] Field of Search .................................. 385/100, 109, 385/110, 111, 112

[56] References Cited

U.S. PATENT DOCUMENTS

| | | | |
|---|---|---|---|
| 4,239,336 | 12/1980 | Parfree et al. | 385/109 X |
| 4,349,243 | 9/1982 | Amano et al. | 385/109 X |
| 4,371,234 | 2/1983 | Parfree et al. | 385/109 X |
| 4,372,792 | 2/1983 | Dey et al. | 156/48 |
| 4,422,718 | 12/1983 | Nakagome et al. | 385/109 X |
| 4,479,702 | 10/1984 | Pryor et al. | 385/109 X |
| 4,508,423 | 4/1985 | Winter et al. | 385/109 X |
| 5,143,274 | 9/1992 | Laupretre et al. | 228/102 |
| 5,238,172 | 8/1993 | Le Davay | 228/104 |
| 5,263,239 | 11/1993 | Ziemek | 29/458 |

FOREIGN PATENT DOCUMENTS

| | | | |
|---|---|---|---|
| 0 023 154 | 1/1981 | European Pat. Off. | 385/109 X |
| 0 313 896 | 5/1989 | European Pat. Off. | 385/109 X |
| 0 727 274 | 8/1996 | European Pat. Off. | 385/109 X |
| 0 727 679 | 8/1996 | European Pat. Off. | 385/109 X |
| 2 029 047 | 3/1980 | United Kingdom | 385/109 X |
| 2 176 905 | 1/1987 | United Kingdom | 385/109 X |
| 2 253 717 | 9/1992 | United Kingdom | 385/109 X |

OTHER PUBLICATIONS

J.R. Osterfield et al., "An Optical Fibre Link in a Mountainous Environment", International Wire & Cable Symposium Proceedings, pp. 202–210, 1980.

*Primary Examiner*—Brian Healy
*Attorney, Agent, or Firm*—Finnegan, Henderson, Farabow, Garrett & Dunner, L.L.P.

[57] ABSTRACT

Optical cable comprising a reinforcing tube with diameter less than 7 mm, obtained from a metal strip gradually deformed until it assumes a final configuration with overlapping outer edges, at least one optical fiber arranged loosely in the tube, a water-blocking fluid occupying 75% of the useful internal area of the tube and a plastic sheath around the tube. The water-blocking fluid is deposited when the strip is curved with edges a predetermined distance apart.

40 Claims, 4 Drawing Sheets

OPTICAL CABLE WITH TUBULAR METAL CORE AND METHOD OF MAKING SAME

BACKGROUND OF THE INVENTION

The present invention refers to an optical cable formed of at least one optical fiber inside a means of reinforcement in the form of a metal tube.

In general, optical cables comprise an optical core, in which one or more optical fibers, separate or grouped, for example, into ribbons or similar, are arranged in a housing for said optical fibers, and a covering that provides protection to the optical core, suited to the specific intended application.

Versions are known in which the optical core includes a metal sheath with the optical fibers inside it and the strength members external to it.

British patent 2 176 905 describes, among other things, a cable comprising a plurality of optical fibers loosely enclosed within a metal tube with a C section. The tube, in turn, is surrounded by steel members with high tensile strength.

U.S. Pat. No. 4,371,234 describes a cable comprising a central strength member, formed of nylon-covered steel strands or strands of a fibrous nature, around which a number of polypropylene-coated optical fibers are arranged, in turn surrounded by a polyester wrap and a sheath of other polyester. An aluminum tube, which is a C-section, is fitted over the sheath and then closed, possibly by welding.

U.S. Pat. No. 4,239,336 refers to cables comprising optical fibers enclosed within a tubular electrical conductor, formed in particular of a tube of aluminum with edges butt-welded or of two half-tubes joined together.

British patent 2253717 cites British patent application 2029047, stating that it recognizes the practical difficulty of forming a continuous metal tube without causing damage to the underlying optical fibers and proposes forming the tube from a flat strip, folded around the fibers with edges spaced apart and closing the resulting gap by an overlying pressure resisting layer, thus avoiding the need to weld the edges and the likelihood of damage to the fibers due to overheating. However, the presence of a gap can in some cases result in a region of weakness.

British patent 2253717 describes a manufacturing process for a fiber optic cable in which the optical fibers are enclosed, when they are fed in a longitudinal direction, by a metal strip folded around the fibers and the edges welded together to form a tubular moisture barrier, the diameter of which, at the welding stage, provides sufficient clearance between the fibers and the heated zone of the welded tube to prevent damage to the fibers due to overheating. The diameter of the formed tube is subsequently reduced by passage through one or more sets of reducing rollers.

Water-blocking means are provided, in the form of a gel, is described, appropriately introduced under pressure through a tube whose outlet is upstream from the welding position.

Cooled gas would also be fed around the fibers and between the fibers and the edges of the folded strip in the welding zone.

U.S. Pat. No. 5,263,239 describes a method for manufacturing an optical cable in which a plurality of optical fibers are embedded in a soft, flexible foam, forming a core, and a metal strip in tubular form shaped around the core, leaving distance between core and tube, welding the tube with a laser device.

The internal diameter of the tube is greater than the cable core so that the core is not damaged by the welding heat.

The welded tube is then drawn down to a diameter close to that of the core by means of a drawing device.

European patent 0023154 describes a cable comprising one or more optical fibers enclosed with a loose-fitting tube which comprises a reinforcing element formed from a metal strip, coated on at least one side with a thermoplastic material, folded into tubular form with overlapping edges, and an extruded plastic sheath.

The heat of extrusion of the plastic sheath causes the fusion of the contacting regions of the thermoplastic coating, sealing the tube. A strip of paper folded in tubular form is arranged around the fibers, with the closed edges of the paper strip diametrically opposite the overlapping edges of the metal tube.

The paper strip folded in tubular form prevents any possible damage to the fibers caused by the inwardly facing edge of the steel strip.

The publication *International Wire & Cable Symposium Proceedings* 1980, pages 202–210, describes a cable sheath created from a strip of tinned steel, coated with polymer on both faces, 25 mm wide, formed into a tube 7 mm in diameter, with longitudinal overlapping that may be secured during the extrusion of an external polyethylene sheath.

Inside the sheath there is sufficient space to place a longitudinal paper strip and for four cladded fibers 0.5 mm in diameter. The publication reports that a diameter of 7 mm was found to be near the lower limit for forming tubes from strip 150 $\mu$m thick by means of a former, since the maximum allowable tensile force would be reduced.

The Applicant notes that reduction of the tube diameter conflicts with the need to utilize support means inside the tube to weld the edges. Without a rigid internal support for the tube, it was not deemed possible to heat-seal the overlapping edges of the tube, due to the need to apply mechanical pressure with sufficient means of thrust.

On the other hand, without effective welding of the tube, it is deemed unlikely that the cable would pass the mechanical tests of repeated torsion-flexure or bending prescribed for the type approval of cables to be installation in pipe. With this in mind, based on the known technique cited above, it is therefore impossible to reduce the diameter value below 7 mm, e.g. diameters of 3–5 mm.

The Applicant has also observed that the need to pass the water infiltration test requires the presence of a predetermined quantity of water-blocking fluid or gel inside the tube enclosing the optical fibers.

In particular, the Applicant has observed that to meet the requirement of ensuring water blockage along the longitudinal axis of the cable, it is desirable to introduce a large quantity of water-blocking substance along with the optical fibers.

For the purposes of this invention, water-blocking material is a material that can be placed within the tube enclosing the optical fibers and prevent the longitudinal passage of water or similar along said tube and, more generally, along the cable.

For purposes of this invention, water-blocking fluid is a material that can be pumped or otherwise fed into the tube enclosing the optical fibers and into other empty spaces inside the cable.

A tube to enclose optical fibers can be made from a metal strip with edges welded, for example, through the action of a laser beam.

During formation of the tube, the optical fibers or ribbons of optical fibers and means for blocking water penetration in the longitudinal direction, in gel form (water-blocking fluid) can be introduced by means of a small auxiliary pipe. In the case of laser welding, the small pipe serves to protect the optical ribbons from the heat emitted by the laser beam.

If, however, the intention is to produce an optical core of small diameter, significantly smaller than 7 mm, the Applicant has observed that if one attempts to achieve this filling by means of a small-diameter pipe, suitable for feeding the water-blocking material into the tubular core along with the optical fibers, the loss of charge caused by the small diameter of the small tube and the viscosity of the water-blocking fluid makes it necessary to use a high feed pressure for the fluid, necessary to permit feeding of the desired volume of fluid within the pipe.

In fact, the flow velocity of the water-blocking fluid in the small pipe (whose diameter is significantly smaller than that of the tubular core) must be sufficiently high (i.e. rather greater than the speed of advancement of the tubular core being formed) to ensure that a sufficient quantity of water-blocking fluid is fed to fill said tubular core. Said high pressure is such that it causes a high risk of damaging the optical elements and altering their arrangement.

To feed into a pipe 2.75 mm in diameter, for example, a quantity of water-blocking fluid sufficient to fill it by 80%, with a production speed of 15 m/min, using a pipe 1.6 mm in inside diameter and 100 mm long, considering a water-blocking fluid with a viscosity of 70 Pas under application conditions, requires a feed pressure of 270 bars.

Under said conditions, it would be difficult to create a high-pressure fluid feed zone avoiding flow in the opposite direction of the cable advancement and fluid-dynamic interactions with the fibers, a source of significant mechanical stress on the fibers.

In particular, experimental tests conducted with a device for feeding water-blocking fluid comprising a pipe 2 mm in inside diameter and 130 mm long, through which is passed an optical fiber, subjected to a braking of around 100 g and without feed overpressure, have demonstrated that overpressure of around 12 bars result in an increase of around 40 g in the traction applied to the fiber (at a fiber velocity of 1.5 m/min); overpressure of around 28 bars results in an increase of around 550 g in the traction applied to the fiber (at a fiber velocity of 3.5 m/min).

Note also that a total traction of around 650 g applied to a ribbon of four optical fibers corresponds to an elongation of said ribbon greater than 1 per thousand.

As an alternative, to preserve the fibers from the damage resulting from the high pumping pressure of the water-blocking fluid or gel, a lower flow rate may be used, but this results in only partial filling of the unoccupied volume of the tubular core and inadequate resistance of the tube to the passage of water in the longitudinal direction.

SUMMARY OF THE INVENTION

According to the present invention, the Applicant observed that by introducing the water-blocking fluid on a curved metal strip open on top, at the same time as the optical fibers, it is possible to feed a quantity of water-blocking fluid equal to values close to total filling of the final area of the tube with edges overlapped and welded and, in particular, to value equal to at least 75% of the internal area of the tube, preferably to values between 75% and 95% of the final tube area.

According to the invention, it was found that the introduction of water-blocking fluid by applying it onto a strip in a specific phase of deformation with an open bathtub-shaped cross-sectional configuration and the successive deformation gradual down to the final tubular form with edged constrained makes it possible to introduce a large quantity of water-blocking fluid, up to the maximum values indicated above.

According to another aspect of the present invention, the Applicant observed that by introducing the water-blocking fluid on a curved metal strip open on top it is also possible to feed the water-blocking material so as to avoid contact with the parts of the strip destined to form the welded edges.

Said edges, remaining free of water-blocking fluid traces, can thus come into proper contact and then be effectively welded.

In this way the edges of the tube are closed so that they can resist to any forces tending to open it during service and/or installation of the cable.

In addition, through this procedure the water-blocking fluid deposited on the strip just formed into curved open shape can advantageously reach between the optical fibers at atmospheric pressure, preserving them from pressures damaging to their integrity and keeping their arrangement unaltered.

It was also found that the quantity of water-blocking fluid according to the values cited is sufficient to block the penetration of water in the longitudinal direction to the cable.

According to another aspect, this invention regards both the case where the water-blocking material consists of a fluid, as previously indicated, and the case where the water-blocking material consists primarily of a hygro-expanding material, preferably supported on a ribbon, that will swell up in the presence of water until it fills the unoccupied space available, forming a so-called "dry" cable, i.e. one without fluids inside, as well as cases where different water-blocking materials are combined together.

A first aspect of the invention is formed of an optical cable including:

a metal tube with edges secured, at least one optical fiber in said tube a water-blocking material contained in said tube, characterized by the fact that said tube has an outside diameter of less than 7 mm and said water-blocking material is present in a predetermined quantity such that a section of cable 1 meter long exposed for 1 hour to a meter head of water manifests no significant passage of water.

Preferably, said metal tube is formed from a metal strip of predetermined width deformed into a tubular configuration with outer edges secured and sealed.

Preferably, said metal tube is formed from a metal strip of predetermined width, coated with a polymer on at least one side, deformed into a tubular configuration with outer edges overlapped and secured by application of heat.

Preferably, at least a sheath of polymer material is placed around the tube.

In particular, the fill of the water-blocking material in the tube preferably has a minimum value of 75% and preferably at least 90%.

In a preferred form, the water-blocking material in the tube is composed of a fluid. As an alternative, the water-blocking material in the tube consists of a hygro-expanding ribbon.

In a preferred form, said edges of said metal tube are overlapped by a width equal to 10% to 20% of the width of the strip.

Preferably, the strip has at least one metallic side with a thickness of 0.10 to 0.20 mm.

In a preferred embodiment, the length of said optical fiber inside said tube exceeds the length of the tube by −0.5 to 2.0 per thousand, preferable between 0 and 1.5 per thousand and more preferably between 0 and 1 per thousand.

Preferably, around the tube there is a plastic sheath.

In a particular embodiment of the optical cable according to the present invention, at least two optical fibers are clustered into a multi-fiber module with a common matrix; preferably, at least three optical fibers are clustered into a basically coplanar configuration, representing a multi-fiber ribbon.

As an alternative, at least two optical fibers are corded together.

According to a further aspect, the present invention regards a procedure for the manufacture of an optical cable comprising at least one optical fiber arranged inside a metal tube comprising the phases of:

advancing a strip of metallic material in a predetermined direction;

plastically deforming said strip until it assumes a basically tubular final configuration;

securing the edges of said strip in a direction basically parallel to the axis of the tube;

feeding at least one optical fiber within the tube;

characterized by the fact that:

said phase of plastically deforming said strip includes at least a first step in which the strip is curved with the edges a predetermined distance apart, and a second step in which the strip is shaped into a basically tubular configuration and a predetermined quantity of a water-blocking material is fed in at an intermediate phase between said first and second steps of said phase of plastically deforming said strip.

Preferably, the edges of said strip are overlapped.

Preferably, the edges of said strip are secured and sealed.

In a preferred embodiment, said water-blocking material consists of a fluid.

As an alternative, said water-blocking material consists of a hygro-expanding strip; preferably, said hygro-expanding strip is secured to said metal strip for a portion of its area.

Preferably, said predetermined quantity of said water-blocking material corresponds to a fill of at least 75% and, more preferably, at least 90%.

Preferably, said predetermined distance between the walls of the metal strip is between 40% and 80% of said predetermined width of said metal strip.

In a preferred embodiment of the procedure according to the invention, at least one optical fiber is fed into said tube subsequent to the feeding of at least a part of said predetermined quantity of water-blocking material. In particular, at least two optical fibers are fed into said tube are fed into said tube in successive phases, and between said phases at least a part of said predetermined quantity of water-blocking material is fed between said optical fibers.

In a particular embodiment, at least one surface of said metal strip is coated with a thermoplastic polymer.

In particular, said phase of securing and sealing said edges of said strip includes the following steps, in sequence:

overlap the edges;

heat the overlapped edges to cause at least a partial melting of said thermoplastic polymer;

cool said edges and at the same time apply pressure on said edges.

In particular, said step of cooling said edges and at the same time applying pressure to said edges is performed without support devices inside the tube.

Preferably, a plastic sheath is subsequent to that step of plastically deforming said strip until an essentially tubular configuration is finally obtained.

In a particular embodiment, strength members are incorporated into said plastic sheath.

According to a particular aspect, the procedure is characterized by the fact of keeping the edges of the metal strip a predetermined distance apart prior to the step of overlapping the edges of the tube.

Preferably, said water-blocking material is introduced onto the strip when the maximum distance between the edges of the metal strip is between 30% and 80% of the width of the strip.

In a preferred embodiment, said phase of introducing a water-blocking material includes at least two phases of feeding water-blocking material, with between them at least one step of feeding in an optical fiber.

According to another aspect, the present invention regards a method for controlling the longitudinal passage of water in an optical cable comprising a metal tube of predetermined diameter and at least one optical fiber in said tube, characterized by the fact that it comprises introducing a predetermined quantity of water-blocking material in said tube of predetermined diameter, such that a section of cable 1 meter long exposed for 1 hour to a 1 meter head of water manifests no significant passage of water.

In particular, that said predetermined quantity of water-blocking material is greater is than 75% and preferably greater than 90%.

In particular, said tube of predetermined diameter preferably has an outside diameter of less than 7 mm.

Greater details may be derived from the following description, with reference to the figures enclosed, in which:

DETAILED DESCRIPTION OF THE INVENTION

Figures 1, 2E:
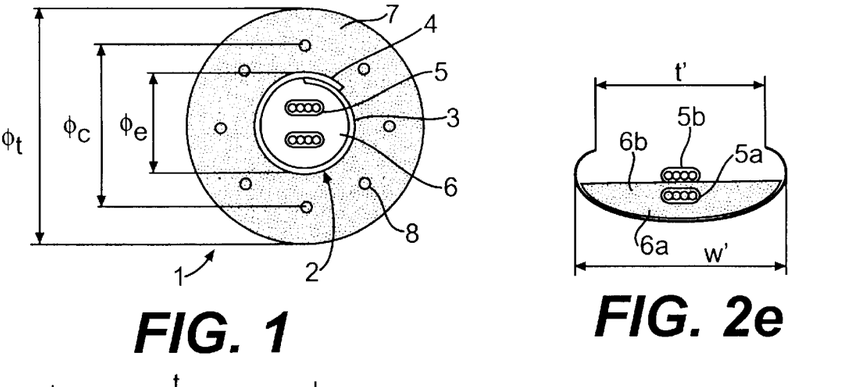
FIG. 1 shows the cross-section of a cable according to the invention.
FIGS. 2*a*–2*h* show, in sequence, the phases for manufacturing the optical core of the cable of FIG. 1.

FIG. 1 represents an example of embodiment of an optical cable 1 that may, for example, be utilized in the fiber-optic telephone distribution networks to the subscriber's home.

Optical cable 1 includes an optical core 2 comprising a steel tube 3, obtained from a metal strip coated with thermoplastic material, consisting of an ethylene copolymer.

The metal strip is coated on at least one side and preferably on both sides. Preferably the thermoplastic material is a copolymer of ethylene or an equivalent thermoplastic material for purposes of heat-sealing with a melt temperature between 45 and 150° C.

The tube is closed and sealed by overlapping the edges and then welding them by simultaneously applying heat and mechanical pressure and by subsequently cooling the welding zone 4.

The outside diameter Φe of the tube in the example described is 3.5 mm, and the inside diameter is 2.75 mm.

In general, the outside diameter is less than 7 mm and preferably between 2 and 5 mm.

Two ribbons of optical fibers 5 are arranged inside the optical core 2, each of them including four optical fibers.

The cable according to the invention may utilize transmission elements other than ribbons of optical fibers, such as single optical fibers with only a primary coating of acrylic or similar, or groups of optical fibers, corded together, or optical fibers clustered into one or more multi-fiber modules where the fibers themselves are clustered or enclosed in suitable coating materials, such as acrylates, polyethylene, PVC, low smoke-emission material, known in the sector by the acronym LSOH, and similar.

The optical fiber ribbons 5 are housed in the tube along with the water-blocking material 6 and, preferably, are separated from each other by the water-blocking material.

Hereinafter the term "water-blocking material" or, more briefly, "water-blocking" shall be used to indicate an element that can block the penetration of water in a longitudinal direction to the cable, if the cable should be broken, for example.

In particular, a preferred water-blocking material is a fluid, semi-fluid or thixotropic mixture and may include, for example, a fat, an oil, a gel and similar, perhaps with viscosity modifiers such as silica or similar.

Optionally said water-blocking material may also contain hygro-expanding element. Water-blocking materials of the type indicated are described, for example, in U.S. Pat. Nos. 5,140,664, 5,150,444 and 5,455,881.

In the example described, the quantity of water-blocking material present is equal to around 90% of the final section of tube 3.

In general, according to the present invention, the quantity of water-blocking material present has a minimum value of 75% of the cross-sectional area of the finished tube and, preferably, a value between 75% and 95% of the final internal cross-sectional area of the tube.

Alternatively, said water-blocking material may be composed of a non-fluid water-blocking material, in particular composed of a hygro-expanding material or similar, preferably supported on a strip, that will swell in the present of water until it fills the unoccupied volume available. Hygro-expanding strips of the type indicated are known in the art and available on the market.

Cable 1 comprises an extruded polyethylene sheath 7 around the optical core 2. Alternatively, sheath 7 may be of polyvinyl chloride (PVC) or a low smoke emitting halogen-free material (LSOH) or another material suitable for forming a plastic sheath on optical cables.

In the example described, sheath 7 encloses a plurality of 8 traction-resistant members, preferably aramidic fibers or glass fibers. The number of members 8 (8 in the example illustrated) may vary, according to requirements, from a minimum of two diametrically opposed up to a plurality of members equally spaced around the circumference. Preferably, in the example described, said strength members are arranged around a circumference with a diameter Φc between 5.5 and 6 mm, as illustrated in the figure.

In an alternative embodiment, the strength members may consist of structures also resistant to compression, such as rounds of glass fiber reinforced plastics or metal. Their number, arrangement, diameter and their formation depends on the values of mechanical resistance required in the manufacturing, operation and installation of the cable, so they may be selected according to an infinite number of solutions deriving from the type of cable desired.

The outside diameter Φt of the cable is, preferably, between 7 and 7.5 mm.

The procedure for producing the cable core is described below with reference to FIGS. 2a–2h.

Figure 2A:
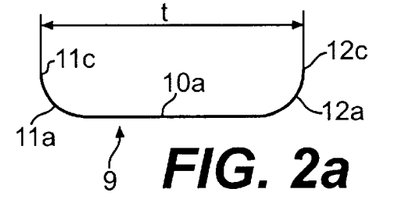

An essentially flat metal strip 9, with width "I" is caused to advance in a longitudinal direction.

To produce the cable of the example described above, the width I of the strip is 12.7 mm and the total thickness 0.255 mm, of which 0.155 mm is steel and 0.100 mm copolymer (a layer of 0.050 mm on each of the two sides of the strip).

A strip of the type indicated is, for example, marketed by Dow Plastics with the trademark Zetabon® S262 (Dow Chemical Company trademark).

In a first phase, as illustrated in FIG. 2a, strip 9 is deformed in proximity to the lateral edges and assumes a configuration characterized by an essentially flat central portion 10a and two lateral portion 11a, 12a curved upwards. In this phase, the distance t between the outer edges of the strip 11c, 12c is around 9.5 mm in the example described.

Figure 2B:
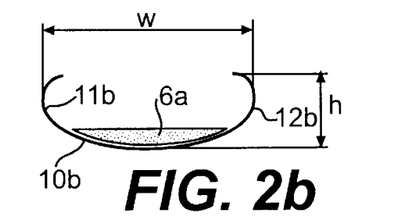

In a subsequent phase, represented in FIG. 2b, the metal strip 9 is further deformed according to a configuration characterized by a central portion 10b and two lateral portions 11b, 12b with a curved profile, to which corresponds a maximum width w, measured inside the lateral portions 11b, 12b, between 30% and 80% of the width I of the strip and a high h between 80 and 110% of the outside diameter Φe of the finished tube. In the example the maximum width w is equal to around 7 mm and the height h is equal to around 3.8 mm.

In a phase in which the metal strip is shaped into the form of an open container, preferably with the central portion concave, an initial quantity of water-blocking material 6a is introduced.

Figure 2C:
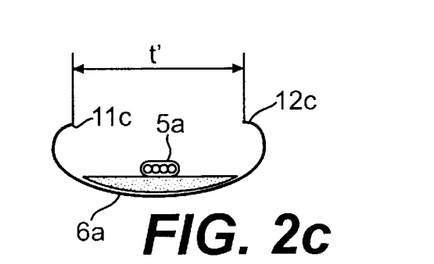

Subsequently, as illustrated in FIG. 2c, a first optical fiber ribbon 5a is deposited on top of the initial quantity of water-blocking material 6a.

Figure 2D:
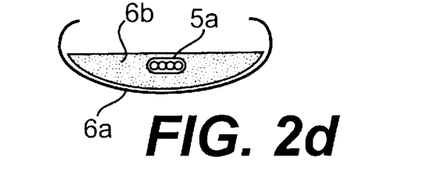

Then, as illustrated in FIG. 2d, a second quantity of water-blocking material 6b is fed in, covering ribbon 5a and joining with the initial quantity of water-blocking material 6a.

A second optical fiber ribbon 5b is then deposited on top of the second quantity of water-blocking material 6b (FIG. 2e).

Appropriately, the aforesaid separate deposition of optical ribbons and water-blocking material makes it possible not only to effectively enclose the optical fiber ribbons in the water-blocking material but also to effectively introduce the water-blocking material into the space between the opposing surfaces of said optical fiber ribbons, preventing the manifestation of reciprocal contact stress between the ribbons, in any portions insufficiently filled, and blocking the passage of water in the longitudinal direction of the optical core in the finished cable.

In fact, in case of absence of water-blocking material between the ribbons, due to the imperfect structural fit of the opposing surfaces of the optical fiber ribbons, water could pass between the surface irregularities of said ribbons.

In the example illustrated in FIG. 2e, the distance w' between the opposing walls is around 7 mm, equal to 55% of the strip width, and the distance t' between the outer edges of the strip 11c, 12c is around 4.9 mm (i.e. around 38% of the strip width).

In general, according to the present invention, the phases of feeding of optical fiber ribbons and water-blocking material are performed when the distance between the outer edges of the strip is between the value t (FIG. 2a), in which the strip has been given an initial curvature, that permits the desired quantity of water-blocking material to remain contained but without coming into contact with the edges of the strip to be overlapped, and a value in which there is sufficient space to permit the passage of the optical fiber ribbons and the means for feeding said ribbons and the water-blocking material. Preferably, with a metal strip of the type indicated above, this minimum value of distance between the outer edges of the strip is around 30% of the strip width.

Figure 2F:
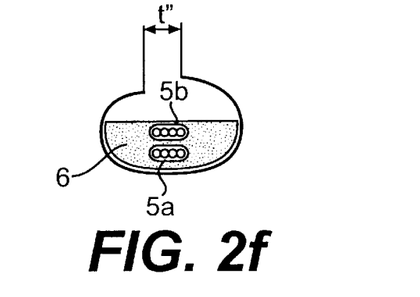
Figure 2G:
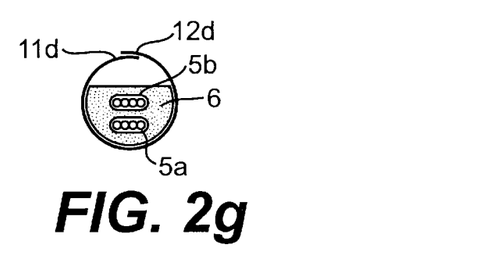
Figure 2H:
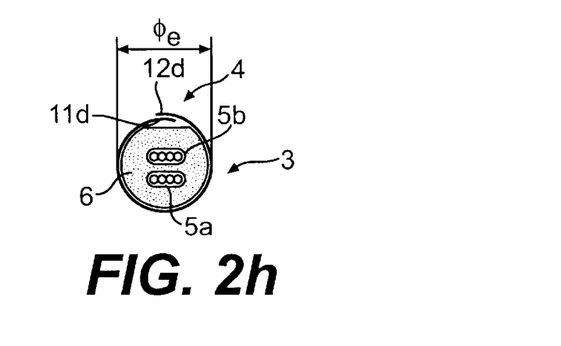

Subsequently, as shown in FIGS. 2f, 2g and 2h, the metal strip 9 is further deformed, so as to pass gradually from an open container configuration, useful for introducing at atmospheric pressure the desired quantity of water-blocking material and the ribbons, to a gradually more closed configuration, until it reaches the final tubular configuration shown in FIG. 2h, in which the outer edges of the strip 11d, 12d overlap each other.

As shown in FIGS. 2f and 2g, the gradual curving of the strip causes the level of water-blocking material to rise inside it, until it completely encloses the optical fiber ribbons.

In the configurations of the strip approaching the final one, the outer edges of the strip 11c, 12c are kept separated in a controlled manner until the final overlapping of edges 11d, 12d, so as to ensure always that the surfaces of the metal strip coated with copolymer destined to contact by overlapping and subsequent welding to each other, corresponding to edges 11d, 12d of the figures, do not come into contact with the water-blocking material and remain partly covered by it, thus compromising the effectiveness of the heat-sealing.

In a preferred embodiment, the distance t" between the outer edges of the strip in the phase of FIG. 2f is around 1.2 mm.

The metal strip 9, continuing its advancement, is gradually deformed so that it is gradually closed on itself, as illustrated in FIGS. 2g–2h.

In accordance with the characteristics of the invention, thanks to the controlled feeding of water-blocking material on the metal strip in the configuration of wide open container, the strip can be closed into a tubular form, with the overlap of edges 11d, 12d, without the water-blocking material touching said overlapping edges, although, as shown in FIG. 2h, the quantity of water-blocking material introduced is such that it occupies most of the useful area, coming into proximity with the sealing area 4 Note that the result indicated may be obtained in the absence of means additional to the fundamental parts of the optical core, consisting of the tube 3, the optical fiber ribbons 5 and the water-blocking material.

In particular, in the present solution, the sealing of the overlapping edges is effected by the application of heat to the copolymer coating, causing it to melt and form the consequent heat-seal.

The melting temperatures are on the order of 90° C. and thus significantly lower than those around 1200° C. required by the use of laser beams to butt-weld the outer edges of the strip.

These temperature values, much lower than those of the laser technique, along with the fact that the optical ribbons, thanks to the way they are inserted according to the phases illustrated in FIGS. 2a–2h, are enclosed in the water-blocking material in the center of the tube 3, appropriately avoid any damage to said ribbons due to the transmission of heat developed in the sealing zone of the edges.

The heat-sealing of the core is then completed by cooling the sealed zone of the edges, while at the same time a mechanical pressure is applied to said edges, contrasted by the flexural rigidity of the curved strip.

In successive phases the cable is then completed with the application of the sheath 7, e.g. by means of extrusion, and the strength members 8, if present. Additional layers of covering, reinforcement, protection or other may also be added, if required by the specific application.

Figure 3:
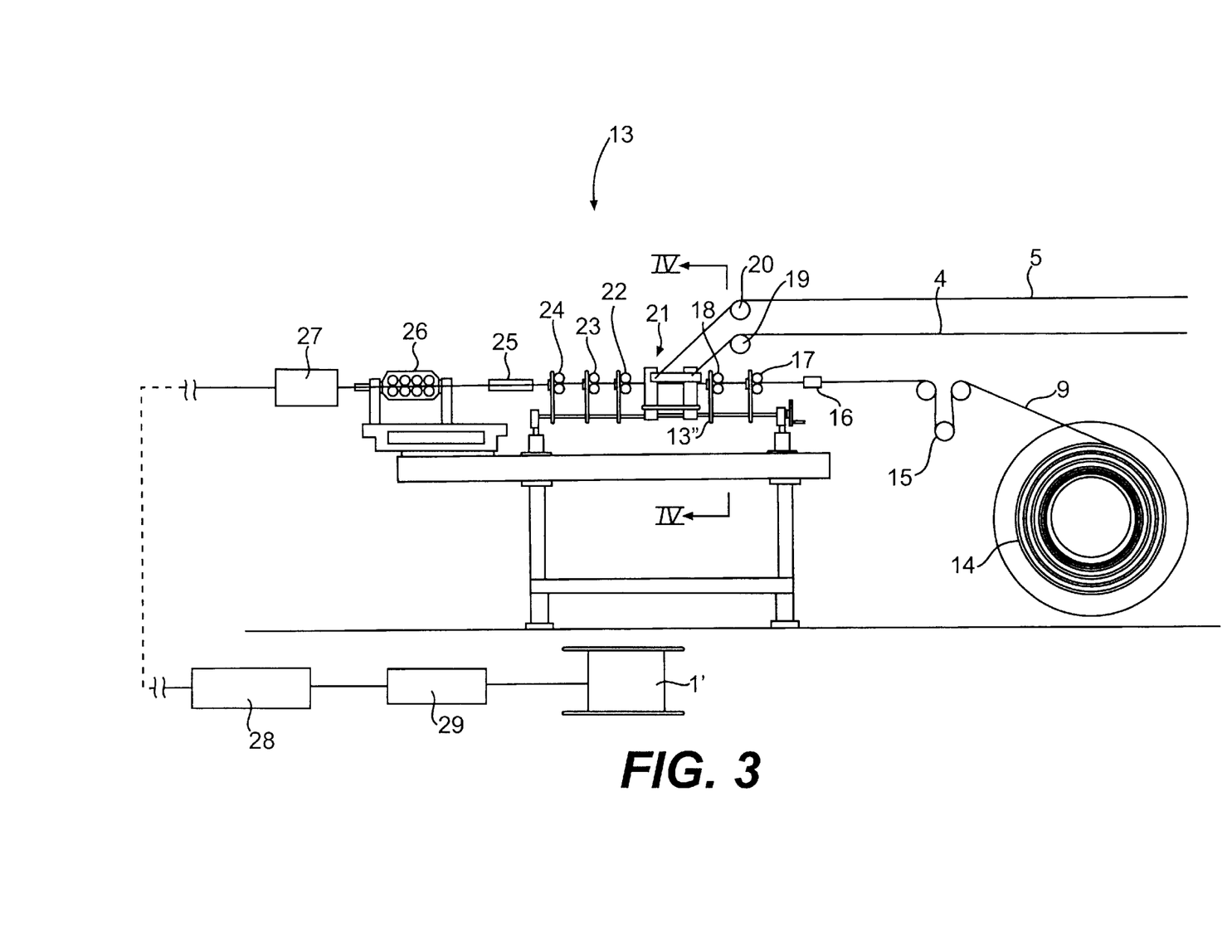
FIG. 3 shows, in a lateral view, a preferential form of the equipment for producing the cable shown in FIG. 1.

A line of equipment for manufacturing the cable of FIG. 1, according to the procedure described above, is composed, for example, as illustrated in FIG. 3.

More precisely, the line 13 comprises:

a decoiler 14 for the bi-coated metal strip 9, with relative means 15 for controlling tension;

means for feeding optical fiber ribbons 5a, 5b a guide 16 for the metal strip 9;

a first group 17 for forming the metal strip, corresponding to the phase illustrated in FIG. 2a;

a second group 18 for forming the metal strip, corresponding to the phase illustrated in FIG. 2b;

a pair of pulleys 19, 20 for guiding the optical fiber ribbons 5a, 5b, distanced from each other, toward the metal strip 9 being formed;

a device 21 for depositing the optical fiber ribbons and water-blocking material onto the metal strip 9 being formed, according to the phases illustrated in FIGS. 2b–2e;

a third group 22 for forming the metal strip, corresponding to the phase illustrated in FIG. 2f;

a fourth group 23 for forming the metal strip, corresponding to the phase illustrated in FIG. 2g;

a fifth group 24 for forming the metal strip, corresponding to the phase illustrated in FIG. 2h;

a device 25 for heat-melting the copolymer on the metal strip, in which tube 3 containing the optical fiber ribbons and water-blocking material is heated, for example, with hot air or with an induction furnace to a temperature between 45 and 150° C., to melt the copolymer;

a cooling roller group 26 in which the rollers, cooled for example by the passage of air between them, apply pressure on opposite sides of the tube 3 to effect the heat-sealing of the two bi-coated steel edges overlapping each other.

The installation for manufacturing the cable further includes, downstream from line 13, an extruder 27 for applying the sheath 7, a water tank 28 for cooling said sheath, a drawing device 29 and a reel 1' for collecting the cable, represented schematically in the figure.

The heat-sealed tube 3, containing inside it the optical fiber ribbons and water-blocking material, arrives at the extruder 27 and the sheath 7 is extruded onto it by means of the extruder 27.

If strength members are used, the installation includes means for decoiling and feeding the said members into the extruder 27 (not shown) or similar devices.

In particular, equipment line 13 employs two essential parts illustrated in greater detail in successive FIGS. 4–7, relative, respectively, to one of the roller groups 17, 18, 22, 23, 24 for the gradual forming of the metal strip into a tube with overlapping edges, and to device 21 for feeding the optical fiber ribbons and water-blocking material onto the partially-formed metal strip.

Figure 4:
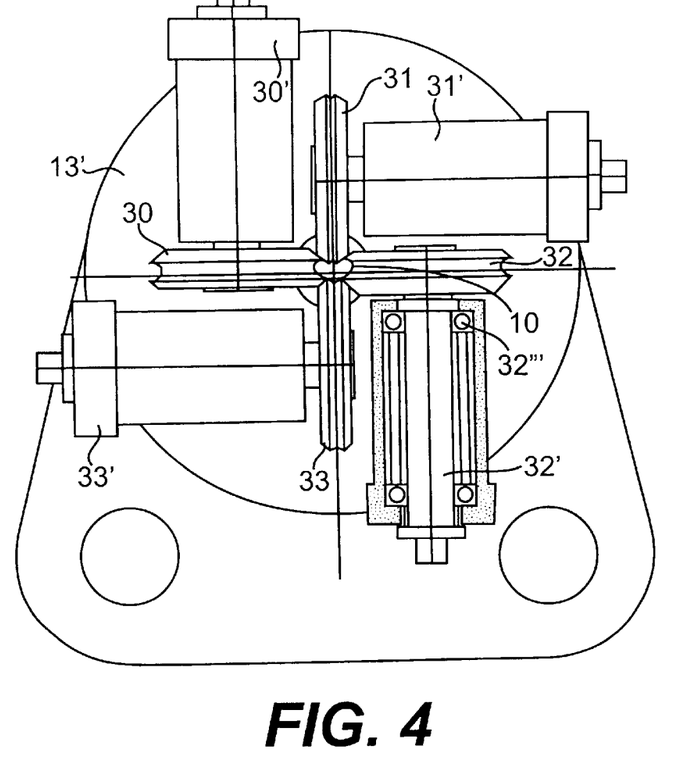
FIG. 4 shows one of the groups for forming the reinforcing tube of the core starting with a metal strip, corresponding to section IV—IV of FIG. 3.

In greater detail, as shown in FIG. 4, each strip forming group comprises four rollers 30, 31, 32, 33, mounted idle on corresponding supports 30', 31', 32', 33'.

In the case of thick ribbons, all or some of rollers 30, 31, 32, 33 may be motorized if necessary.

Figure 5:
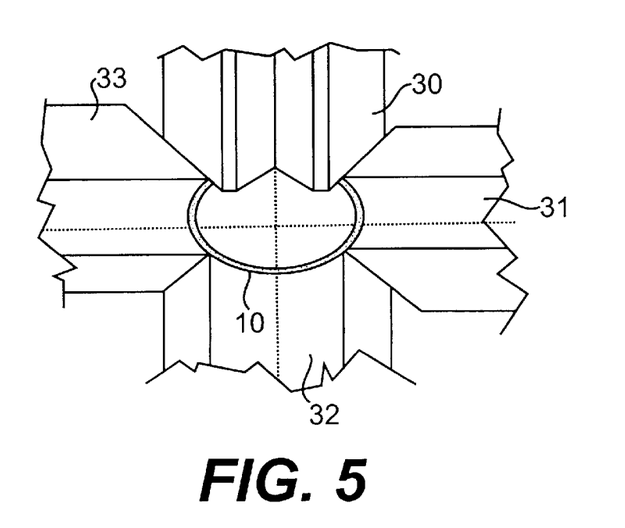
FIG. 5 shows an enlarged view of the item in FIG. 4 of the rollers for forming the core reinforcing tube.

Each roller has its own profile for forming the metal strip, and overall the four rollers are squeezed together such that their working profiles generate by plastic deformation the desired section of the strip in gradual transformation toward a tubular configuration, as shown in FIG. 5.

In group 18, illustrated in FIG. 5, the overall profile defined by the rollers corresponds to the configuration of the metal strip corresponding to the phases shown in FIGS. 2b–2e.

In said configuration, roller 30 has the particular task of maintaining the distance between the outer edges that will be sealed, ensuring a suitable value "t'" of the opening through which the optical fiber ribbons and water-blocking material are introduced.

The other forming groups comprise respective idle-mounted rollers like those previously illustrated with profiles such that, squeezing together, give rise to the various different sections illustrated in FIGS. 2a–2h.

As shown in FIG. 4, each of the supports 30', 31', 32', 33' of each forming group is secured to a support frame 13', secured in turn to the fixed structure 13" of equipment line 13. As depicted for the sake of simplicity for just one of the supports, a shaft 32" rotates on its axis by means of bearings 32"', and the relative forming roller is secured to the end of said shaft.

The use of forming rollers constitutes an advantageous aspect of the equipment line of FIG. 3, since it permits the use of in-line production speeds on the order of 15–20 meters/minute, significantly greater than those obtainable with metal strip formers with fixed sliding surfaces, which would indicatively be on the order of 3–4 meters/minute.

For special requirements, as with particularly thick strips, one or more of forming rollers 30–33 may be motorized, thus reducing the drawing force.

Figure 6:
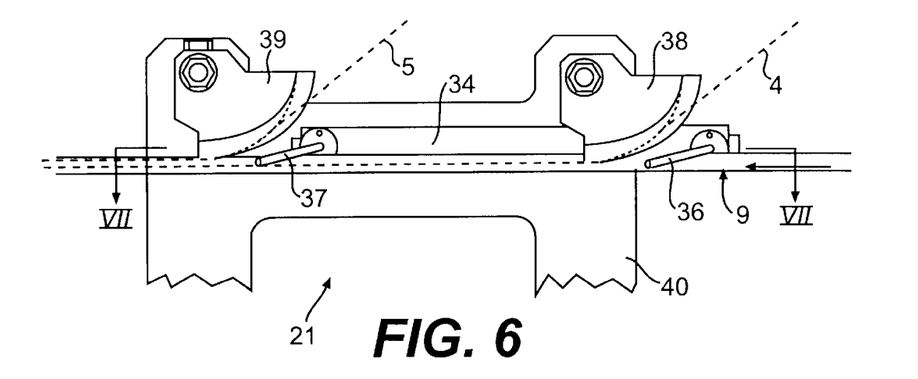
FIG. 6 shows a lateral view of the device for feeding the optical transmission elements and the water-blocking material onto the metal strip being formed by the device shown in FIG. 3.
Figure 7:
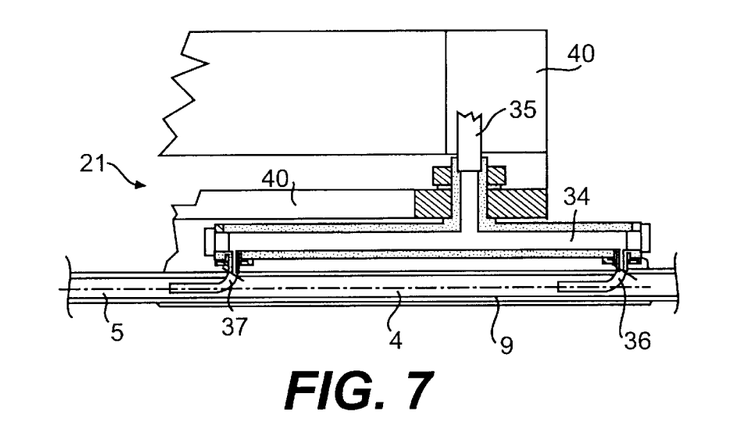
FIG. 7 shows the section along plane VII—VII of FIG. 6.

The device 21 for feeding the optical fiber ribbons and water-blocking material, illustrated in FIGS. 6, 7, comprises an element for feeding the water-blocking material, having a central manifold 34 into which the water-blocking material flows through a feed pipe 35, and out of which the water-blocking material flows through two pipes 36 and 37 separated each other in the axial flowing direction of the cable; the water-blocking material flows through the two pipes 36 and 37 under essentially atmospheric pressure, directed onto the metal strip with its container configuration open on top.

The water-blocking material is fed into the feed pipe 35 by a constant-flow pump.

Preferably, the water-blocking material is introduced at ambient temperature, or preheated to a moderate temperature, not greater than 80° C., preferably between 50 and 70° C., so that it will not dilate on the metal strip and can spread uniformly along the walls of the strip being formed without coming into contact with the strip edges, coated with copolymer, destined for later overlapping.

Preferably, the water-blocking material is formed of a mixture comprising a gel with a silicon- or hydrocarbon-type oil base.

In particular, the water-blocking material in gel form has viscosity between 90 and 120 Pascal×second at ambient temperature.

The feeding group for the optical fiber ribbons 5a, 5b comprises guides 38, 39, in the form of sliding guides, as illustrated in FIG. 6, or revolving pulleys, in cases where the dimensions permit.

The complex is supported by a frame 40.

Preferably, optical ribbons 5a, 5b upstream from the feed group are suitably braked so as to have an abundance of around 0.5 per thousand when the cable is finished.

As shown in FIG. 6, guide 38 is positioned downstream from pipe 36, and guide 39 is positioned downstream from pipe 37.

In this way, each of optical fibers 5a, 5b is deposited inside the metal strip 9 in formation after a relative layer of water-blocking material has been fed in.

Furthermore, the bottom periphery of each guide 38, 39 is essentially tangential to the axial direction F of advancement of the cable in formation and aligned with the outlets of the pipes 36, 37.

The aforesaid relative arrangement between guides and pipes produces the first introduction of an initial quantity of water-blocking material through pipe 36, onto which ribbon 5a is placed, as illustrated in FIG. 2c, and subsequently the introduction of a second quantity of water-blocking material through pipe 37 which encloses the optical ribbon 5a and separates it from optical ribbon 5b, subsequently placed on said water-blocking material, as illustrated in FIG. 2e.

If more separate transmission elements are used, e.g. more optical fiber ribbons, or optical fibers separate or clustered into groups, the water-blocking material is preferably applied in several subsequent stages, interposed between the feed points of the optical fibers, thus obtaining a more uniform distribution of said water-blocking material between the transmission elements.

This invention also contemplates the case in which a non-fluid water-blocking material is used, in particular one consisting of a hygro-expanding material or similar, preferably supported on a strip, that swells up in the presence of water until it fills the unoccupied volume available. Hygro-expanding strips of the type indicated are known in the art and available on the market.

In this case, it is necessary to ensure that a portion of the hygro-expanding strip does not position itself during the cable manufacture phase between the edges of the metal strip to be secured and sealed, compromising the effectiveness of said seal.

According to the invention, applying the hygro-expanding strip onto the metal strip in an intermediate phase of its formation, it is possible to control its positioning and keep it from coming into contact with the edges to be sealed.

Preferably, said hygro-expanding strip is applied on the metal strip when it is still in a basically flat configuration or with limited curvature.

Preferably, further, a portion of the surface of the hygro-expanding strip is secured to the metal strip with an adhesive or similar that can prevent undesired movements during subsequent operations.

To evaluate the results obtained with the particular deposition of the water-blocking material at atmospheric pressure on the strip in the open-container configuration in the large quantity indicated previously, various comparative tests were performed to determine the resistance offered by the cable to the passage of water in the longitudinal direction to the cable in the case of cable breakage.

The following table indicates the tests performed using in all tests the same cable geometry, varying only the coefficient of fill of the reinforcing tube 3, which encloses two optical ribbons.

| Test | Number of optical ribbons | Fill C (%) | Test result for water passage |
|------|---------------------------|------------|-------------------------------|
| 1    | 2                         | 47%        | Negative                      |
| 2    | 2                         | 49%        | Negative                      |
| 3    | 2                         | 68%        | Negative                      |
| 4    | 2                         | 70%        | Negative                      |
| 5    | 2                         | 94%        | Positive                      |
| 6    | 2                         | 94%        | Positive                      |
| 7    | 2                         | 94%        | Positive                      |

The coefficient of fill of the tube 3 was defined as follows:

$$At = QN/Vl$$

where:

At=cross-sectional area theoretically filled (mm²)
Q=pump flow rate (cm³/rev)
n=pump speed (rpm)
Vl=line velocity (m/min)
Considering the internal area of the pipe with the formula:

$$AR = \pi(\Phi e - 2s)^2/4$$

where:

Φe=outside diameter of the tube (equal to 3.5 mm in the example)
s=thickness of the steel strip (equal to 0.255 mm in the example) producing the following expression for the coeffecient of fill C, whose values are shown in the table according to the respestive tests:

$$C(\%) = (At/Ar) \cdot 100$$

Figure 8:
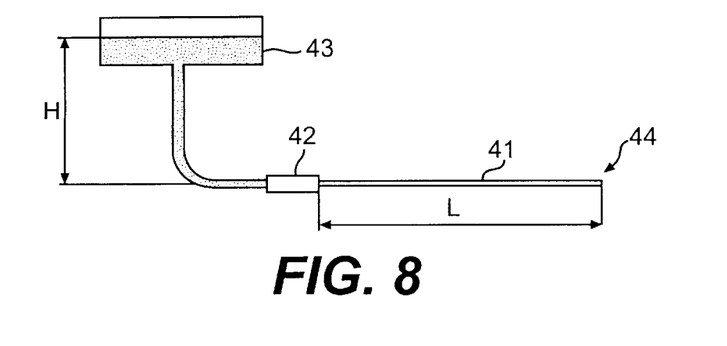
FIG. 8 shows a schematic representation of the test equipment for verifying the resistance of the cable to the passage of water.

The tests were performed with the procedure illustrated in FIG. 8, placing a section of cable 41 with length L=1000 mm under a water head of 1000 mm, the cable section connected at one end through a clamp 42 to a reservoir 43 and controlling any leakage of water at the free end 44 of the cable.

The test was deemed positive when no water had leaked from the end 44 of the cable section after 1 hour.

The tests indicated the high values of the water-blocking material fill coefficient obtained and the fact that said values were useful for providing high resistance to the propagation of water in the cable.

These optimal values of the fill coefficient are possible thanks to the characteristics of the present solution regarding the introduction of a large quantity of water-blocking material onto the bi-coated steel strip in the form of a very open container, preserving the optical fibers from fluid-dynamic interactions.

The quantity of water-blocking material, though quite high, did not interact fluid-dynamically to a critical extent with the optical fibers, since the water-blocking material is introduced at atmospheric pressure.

It was observed that values of around 70% did not provide sufficient assurances that the total number of sample subjected to the water passage test would give a positive result.

In the particular case of the example regarding a fill coefficient of 70%, through determining that most of the sample gave a positive result, the result was negative for about one-third of the sample tested.

When the fill coefficient drops to values below 70%, the result is an inadequate resistance to the passage of water in the longitudinal direction, as evidenced by the table data, under conditions similar to those in which a smaller quantity of water-blocking material was introduced by means of a small pipe, together with the optical fibers if necessary.

The fill coefficient of 94% represents a satisfactory value, one that provides adequate resistance to the passage of water.

It was also found that the uniform arrangement of the water-blocking material made possible by its introduction onto the open metal cable resulted in good distribution in every cross section, even with fill coefficient value down to the minimum value of 75%.

I claim:

1. Optical cable comprising:
   a metal tube with sealed edges,
   at least one optical fiber in said tube,
   a water-blocking material contained in said tube,
   wherein said tube has an outside diameter of less than 7 mm and said water-blocking material is present in a predetermined quantity, such that a section of cable 1 meter long exposed for 1 hour to a water head of 1 meter manifests no significant passage of water.

2. Optical cable according to claim 1 wherein said metal tube is formed from a metal strip of predetermined width deformed into a tubular configuration with outer edges secured and sealed.

3. Optical cable according to claim 1 wherein said metal tube is formed from a metal strip of predetermined width, coated by a polymer on at least one side, deformed into a tubular configuration with outer edges overlapped and sealed by applying heat.

4. Optical cable according to claim 1 wherein said cable includes at least a sheath of polymer material placed around the tube.

5. Optical cable according to claim 1 wherein the filling of the water-blocking material into the tube has a minimum value of 75%.

6. Optical cable according to claim 5 wherein the filling of the water-blocking material into the tube has a value of at least 90%.

7. Optical cable according to claim 1 wherein the water-blocking material in the tube consists of a fluid.

8. Optical cable according to claim 1 wherein the water-blocking material in the tube consists of a hygro-expanding strip.

9. Optical cable according to claim 2 wherein said edges of said metal tube are overlapped by a width between 10% and 20% of the width of the strip.

10. Optical cable according to claim 2 wherein the strip has at least one metallic side with thickness between 0.10 and 0.20 mm.

11. Optical cable according to claim 1 wherein said optical fiber inside said tube has an excess length with respect to said tube between −0.5 per thousand and 2 per thousand.

12. Optical cable according to claim 11 wherein said excess length is between 0 per thousand and 1.5 per thousand.

13. Optical cable according to claim 11 wherein said excess length is between 0 per thousand and 1 per thousand.

14. Optical cable according to claim 1 wherein the tube is surrounded by a sheath of plastic material.

15. Optical cable according to claim 1 wherein at least two optical fibers are clustered into a multi-fiber module with a common matrix.

16. Optical cable according to claim 13 wherein at least three optical fibers are clustered into an essentially coplanar configuration, forming a multi-fiber ribbon.

17. Optical cable according to claim 1 wherein at least two optical fibers are corded together.

18. Procedure for the manufacture of an optical cable including at least one optical fiber inside a metal tube including the phases of:

advancing a strip of metal material in a predetermined direction;

plastically deforming said strip until it assumes a final configuration that is essentially tubular;

securing the edges of said strip in a direction essentially parallel to the axis of the tube;

feeding at least one optical fiber inside the tube; and wherein said phase of plastically deforming said strip comprises:
a first step in which the strip is curved with edges at a predetermined distance from each other, and
a second step in which the strip is formed into an essentially tubular configuration,
a predetermined quantity of a water-blocking material being fed onto said strip at an intermediate phase between said first and said second step of said phase of plastically deforming said strip.

19. Procedure according to claim 18 wherein the edges of said strip are overlapped.

20. Procedure according to claim 18 wherein the edges of said strip are secured and sealed.

21. Procedure according to claim 18 wherein said water-blocking material consists of a fluid.

22. Procedure according to claim 18 wherein said water-blocking material consists of a hygro-expanding strip.

23. Procedure according to claim 22 wherein said hygro-expanding strip is secured to said metal strip by a portion of its surface.

24. Procedure according to claim 18 wherein said predetermined quantity of said water-blocking material corresponds to a fill of at least 75%.

25. Procedure according to claim 24 wherein said predetermined quantity of said water-blocking material corresponds to a fill of at least 90%.

26. Procedure according to claim 18 wherein said predetermined distance between the edges of the metal strip being between 40% and 80% of the width of the metal strip.

27. Procedure according to claim 18 wherein at least one optical fiber is fed into said tube subsequent to the feeding of at least a part of said predetermined quantity of water-blocking material.

28. Procedure according to claim 27 wherein at least two optical fibers are fed into said tube in subsequent phases and that between said subsequent phases at least a part of said predetermined quantity of water-blocking material is fed between said optical fibers.

29. Procedure according to claim 19 wherein said metal strip includes a coating of at least one surface with a thermoplastic polymer.

30. Procedure according to claim 29 wherein said phase of securing said edges of said strip comprises, in sequence, the phases of:

overlapping the edges one on the other;

heating the overlapped edges to cause at least part of said thermoplastic polymer to melt;

cooling said edges and at the same time applying pressure on said edges.

31. Procedure according to claim 30 wherein said phase of cooling said edges and at the same time applying pressure on said edges is performed without supporting devices inside the tube.

32. Procedure according to claim 18 wherein a plastic sheath is applied subsequent to said phase of plastically deforming said strip until an essentially tubular final configuration is obtained.

33. Procedure according to claim 32 further comprising the phase of enclosing strength members in said plastic sheath.

34. Procedure according to claim 30 further comprising the phase of keeping the edges of the metal strip at a predetermined distance from each other prior to the phase of overlapping the edges of the tube.

35. Procedure according to claim 30 wherein said water-blocking material is introduced onto the strip when the maximum distance between the edges of the metal strip is between 30% and 80% of the width of the strip.

36. Procedure according to claim 18 wherein said phase of introducing a water-blocking material into said tube includes at least two phases of feeding water-blocking material, with at least one phase of feeding an optical fiber in between.

37. Method for controlling the longitudinal passage of water in an optical cable comprising a metal tube of predetermined diameter and at least one optical fiber in said tube, said method comprising:

the introduction of a predetermined quantity of water-blocking material in said tube of predetermined diameter, such that a section of cable 1 meter long exposed for 1 hours to a water head of 1 meter manifests no significant passage of water.

38. Method for controlling the longitudinal passage of water in an optical cable according to claim 37, wherein said predetermined quantity of water-blocking material has a fill of greater than 75%.

39. Method for controlling the longitudinal passage of water in an optical cable according to claim 37, wherein said predetermined quantity of water-blocking material has a fill of greater than 90%.

40. Method for controlling the longitudinal passage of water in an optical cable according to claim 37, wherein said tube of predetermined diameter has an external diameter of less than 7 mm.

* * * * *